United States Patent [19]

Weil et al.

[11] 4,052,097
[45] Oct. 4, 1977

[54] CART FOR HIGH DECK AMBULANCES

[75] Inventors: Burt Weil, Cincinnati; Richard H. Ferneau, Washington Court House, both of Ohio

[73] Assignee: Burt Weil, Cincinnati, Ohio

[21] Appl. No.: 678,223

[22] Filed: Apr. 19, 1976

[51] Int. Cl.² .............................................. B62H 3/02
[52] U.S. Cl. ........................................ 296/20; 5/81 B
[58] Field of Search .................. 296/19, 20; 5/81, 82, 5/86, 83

[56] References Cited

U.S. PATENT DOCUMENTS

| 3,759,565 | 9/1973 | Ferneau | 296/20 |
| 3,826,528 | 7/1974 | East | 296/20 |

Primary Examiner—Philip Goodman
Attorney, Agent, or Firm—Wood, Herron & Evans

[57] ABSTRACT

A cart having a bed with auxiliary wheels on the front end, front and rear legs depending from the bed and pivotally mounted to the bed, means for shifting the front legs to elevate the front of the cart so that it can be thrust into an ambulance with a high deck with the auxiliary wheels rolling on the deck and the front and rear legs swinging rearwardly to a collapsed condition. The front legs are also adapted to swing in the forward direction while the rear legs swing rearwardly in order to change the level of the cart when it is in a horizontal attitude.

2 Claims, 14 Drawing Figures

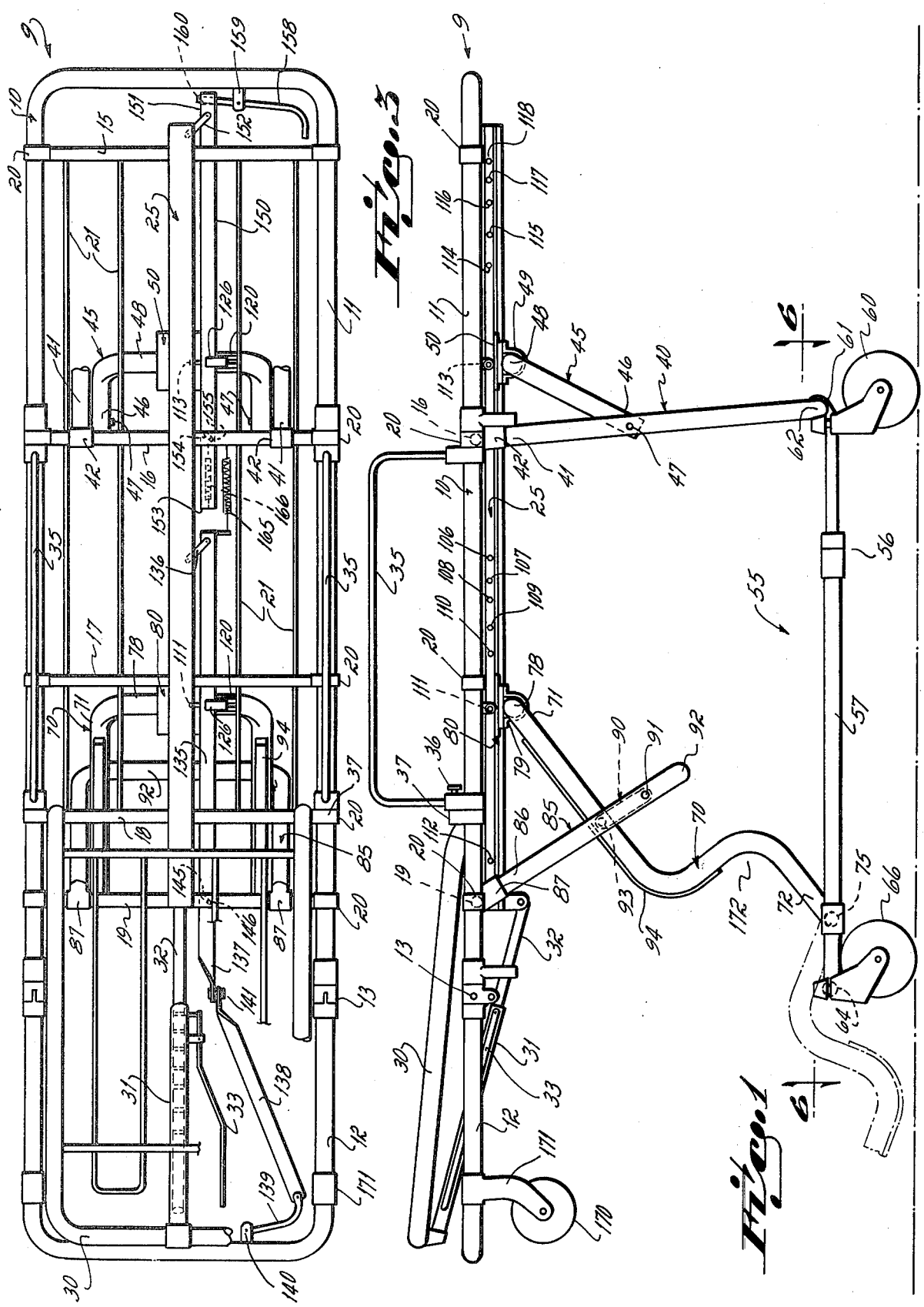

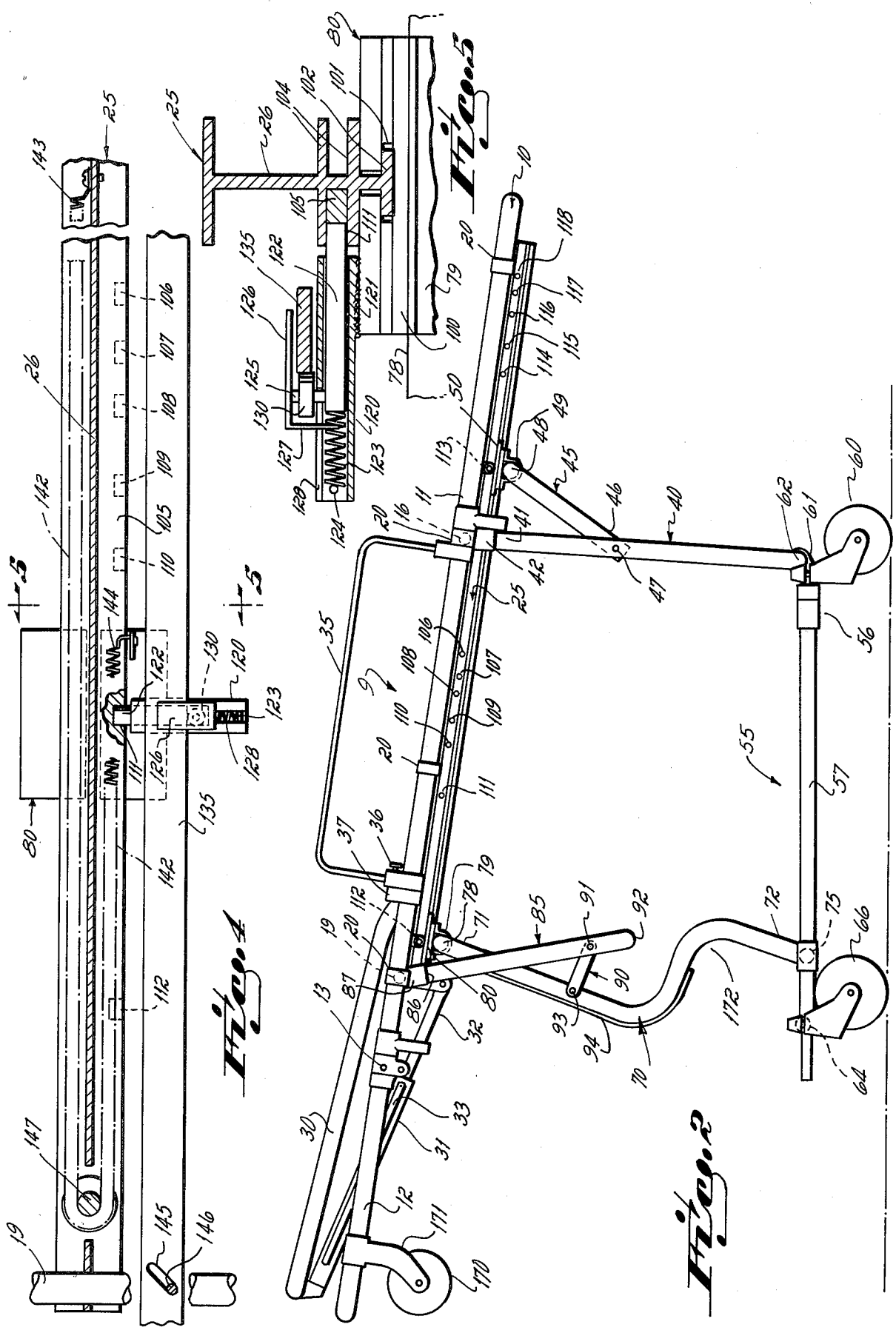

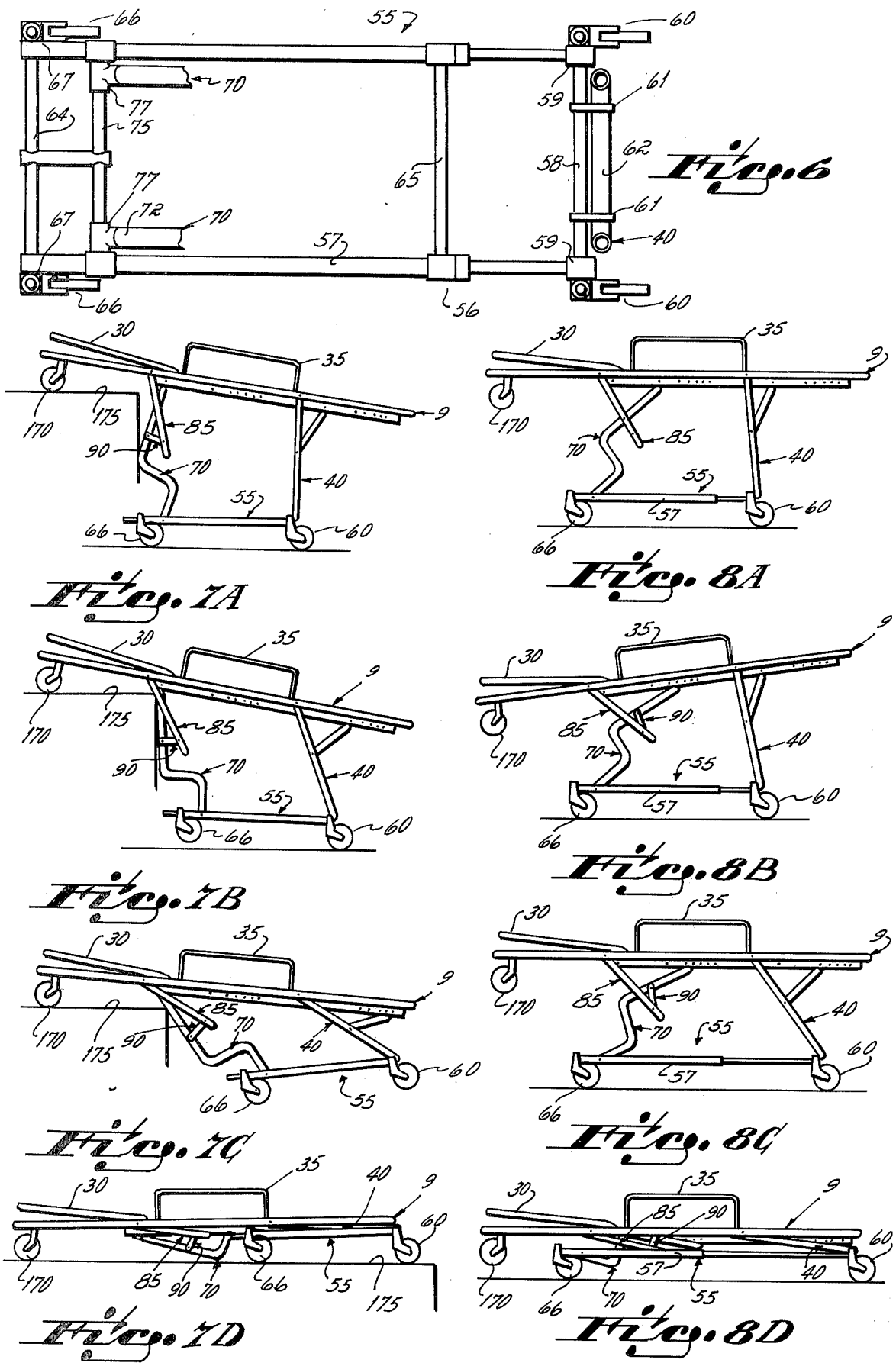

CART FOR HIGH DECK AMBULANCES

This invention relates to carts and is an improvement in the carts disclosed in application Ser. No. 545,969, filed Jan. 31, 1975, and U.S. Pat. No. 3,826,528.

More particularly, the invention is directed to a cart specifically designed for use with a modular ambulance or other vehicle wherein the deck onto which the cart is to be loaded is much higher than that of prior ambulances. The prior ambulances have deck heights of about 25 inches, whereas in the newer modular ambulances the deck height is about 32 inches.

One type of conventional cart presently being used in modular ambulances employs X-frame legs to support the bed of the cart. Through the X-frame, it is possible to raise and lower the bed of the cart with respect to the casters supported on the lower part of the X-frame between ground level and hospital bed height. This conventional cart presents difficulties to the attendants from the standpoint of lifting a patient into an ambulance as well as from the standpoint of lifting the patient out of an ambulance, both operations being particularly difficult for an attendant who is rather short of stature.

When lifting a patient into an ambulance, it is difficult for even two attendants to raise the cart and a heavy patient high enough so that the wheels of the cart clear the 32 inch height of the deck in order for the cart to be thrust into the ambulance.

Similarly, in removing the patient and cart from the ambulance, difficulties are encountered. One procedure is to ease the cart out of the ambulance and to lower it to the ground in its collapsed condition. Thereafter the bed is raised with respect to the casters so that the patient can be wheeled into the hospital.

Alternatively, and some operators prefer this, the cart is eased out of the ambulance and the X-frame and casters are permitted to drop so that the cart is at bed level upon its removal from the ambulance. One of the difficulties in the latter procedures involves the inaccessibility from the side of the cart of the release lever at the end of the cart for releasing the X-frame undercarriage.

The carts of application Ser. No. 545,969 and U.S. Pat. No. 3,826,528 are improvements over the conventional cart with the X-frame undercarriage. In the improved carts, auxiliary wheels are provided at the front end of the bed and the legs are capable of swinging rearwardly as a cart, supported in part on the auxiliary wheels, is thrust onto an ambulance deck. The auxiliary wheels support a substantial portion of the weight of the patient and the operating lever is at an accessible position at the rear of the cart for the attendants who are thrusting the cart into the vehicle or removing the cart from the vehicle. The improved carts also have the capability of swinging the legs outwardly with respect to one another for varying the level of the cart.

The improved carts, however, are primarily suitable for ambulances with a low (approximately 25 inches) deck. The auxiliary wheels are not high enough to be rolled onto a 32 inch deck. A cart built high enough to accommodate a 32 inch deck would be unwieldy and perhaps unstable in having to be high enough to clear the deck.

An objective of the present invention has been to provide the cart having the advantages of the improved carts of application Ser. No. 545,969 and U.S. Pat. No. 3,826,528 while at the same time having means to accommodate the thrust of the cart into a modular ambulance having a high deck level.

This objective of the invention is attained by providing a cart whose bed, in its highest position, is at hospital bed level, that is, about 28 inches, with the auxiliary wheels depending from it at a level of about 20 inches. Means are provided to raise the front end of the cart to bring the auxiliary wheels up to a level of about 32 inches so that the cart may easily be thrust into an ambulance having a high deck level.

More specifically, in the cart of the present invention the front legs of the cart are pivoted at their lower ends to a frame which supports the casters and are pivoted at their upper ends to a slide mounted on the bed normally at a location substantially rearward of the lower ends of the legs. By sliding the upper ends of the legs forward, the front end of the cart is raised a sufficient distance to enable the cart to be thrust into the high deck type ambulance.

Another feature of the invention resides in the employment of a brace pivoted toward the front end of the cart and connected to the legs through clevis links to provide a triangular bracing relationship between the front leg, brace, and bed when the cart is in its normal horizontal position and which permits the collapse of the triangular brace as well as the rearward swinging of the legs when the upper ends of the legs have been slid forwardly to raise the front of the cart.

All of the foregoing features have been provided while still retaining the capability of spreading the legs outwardly to lower the bed of the cart to various levels to permit it to be used for patient transfers at hospital bed level, home bed level and ground level.

The several features and objectives of the present invention will become more readily apparent from the following detailed description taken in conjunction with the accompanying drawings in which:

FIG. 1 is a side elevational view of the cart at normal level;

FIG. 2 is a side elevational view of the cart with its front end raised for introduction into an ambulance;

FIG. 3 is a top plan view of the cart;

FIG. 4 is a cross-sectional view taken through the central slide bar of the cart;

FIG. 5 is a cross-sectional view taken along lines 5—5 of FIG. 4;

FIG. 6 is a plan view of the telescoping lower frame taken on lines 6—6 of FIG. 1;

FIGS. 7A to 7D are diagrammatic side elevational views of the operation of the cart in thrusting it into an ambulance; and FIGS. 8A through 8D are side elevational views of the cart showing the changing of the level of the cart bed.

The cart has a bed 9 consisting of a generally rectangular frame 10 formed by an elongated U-shaped tubular member 11 at the rear end of the cart and by a short U-shaped tubular member 12 at the front of the cart. The member 12 is connected to the member 11 by hinges 13 which are releasable which permits the member 12 to swing down to a vertical position thereby shortening the overall length of the cart to facilitate its passage around sharp corners, elevators and the like. The member 11 is braced by transverse rods 15, 16, 17, 18 and 19 which are connected to the frame by suitable fittings 20. Longitudinal rods 21 are secured to the transverse rods 15 and 19 and pass through the transverse rods 16 and 17, thereby forming a support for a mattress to be placed upon the bed 9. A longitudinal beam 25 extends through the center of the bed between the transverse rods 15 and 19, the beam being generally of an I beam configuration, as shown in FIG. 5, and having a vertical web 26 through which the transverse rods 15, 16, 17, 18 and 19 pass.

A conventional backrest 30 is pivotally mounted on the rod 18 and may be adjustably positioned in one of several angularly elevated positions by a pair of telescoping tubes 31 and 32. The tube 31 carries a lever 33 having a pin on its lower end adapted to project into holes formed in the tube 32 to lock the backrest in any of its elevated positions.

Conventional guard rails 35 are pivotally mounted on the tubular member 11 and are adapted to swing from the vertical position shown in FIG. 2 either across the bed 9 or downwardly alongside the cart. Each guard rail carries a spring-loaded pin 36 which is projectable into a hole in a bracket 37 mounted on the tubular member 11 to secure the guard rails in the vertical position.

A pair of rear legs 40 extend downwardly in a generally vertical manner from the bed 9. The legs are formed as a U-shaped tubular member whose upper ends 41 are secured to fittings 42, the fittings in turn being pivotally mounted on the transverse rod 16 to permit the legs to pivot with respect to the bed. An inverted U-shaped angulated brace 45 has ends 46 pivotally connected at 47 to the rear legs. The brace 45 has a bight portion 48 rotatably mounted in a bracket 49 which is fixed to a slide 50 slidably mounted on the beam 25.

The lower ends of the legs 40 are pivotally secured to a generally rectangular telescoping frame 55. The frame has on each side a rear member 56 which telescopes into front tubular members 57 to permit the frame to extend and contract, as will be described below. A crossbar 58 interconnects the ends of the telescoping members 56 and is fixed to a fitting 59 to which the members 56 and swivel casters 60 are also secured. The crossbar 58 has two fittings 61 which pivotally receive the bight portion 62 of the rear legs 40, thereby pivotally securing the legs to the frame 55.

The tubular telescoping members 57 are joined at their front ends by a crossbar 64 and at their rear ends by a crossbar 65. The crossbar 64, the ends of the tubular members 57 and front swivel casters 66 are all secured to fittings 67 at the front of the rectangular frame 55, thereby completing the formation of the frame. The telescoping frame supports the swivel csters with their axes maintained in a vertical attitude regardless of the angular position of the legs, all as set forth in application Ser. No. 545,969.

S-shaped front legs 70 are pivotally secured at their upper ends 71 to the bed 9 and at their lower ends 72 to the frame 55 and particularly the tubular telescoping members 57. The lower ends of the front legs 70 are pivotally secured by fittings 77 to a crossbar 75.

The front legs 70 are formed by an inverted U-shaped member having an upper bight portion 78 which is pivotally mounted in a bracket 79. The bracket 79 is fixed to a slide 80 slidably mounted on the beam 25. A U-shaped brace 85 is pivotally mounted at its upper ends 86 to the bed 9. More particularly, the upper ends are secured to fittings 87, the fittings being pivotally mounted on the rod 19. A clevis link 90 is pivotally secured at one end 91 to the brace 85 immediately above the bight portion 92 of the brace. The two ends 93 of he clevis link are pivotally secured to each of the front legs 70. The front surface of each leg 70 is covered by a nylon pad 94 for protection of the legs as the cart is thrust into an ambulance and to reduce friction during the introduction of the cart into the ambulance.

The slides 50 and 80 for the rear brace 45 and front legs 70, respectively, are substantially identical and only one will be described. Slide 80 is shown in FIGS. 4 and 5. Each slide 50 and 80 (80 being shown) has a block 100 built up from plates to form an inverted T-slot 101. The beam 25 has a lower flange 102 which is received in the T-slot 101 to permit the slide to slide with respect to the beam. Each bracket (79 being shown) is secured to the block 100.

The beam 25 has two intermediate parallel flanges 104 which receive an elongated lock member 105 having a series of holes 106–112 which determine the position of the slide 80. Similar holes 113–118 are formed at the rear end of the lock member for positioning the slide 50. A tube 120 is welded as at 121 to the upper surface of the block 100. An elongated bolt 122 is slidable in the tube and is urged by a spring 123 toward the lock member 105, the spring being held in the tube by a pin 124. A pin 125 is fixed to the outer end of the bolt 122 and has an L-shaped plate 126 secured to it. The L-shaped plate has a depending end 127 passing through a slot 128 in the tube to maintain the plate, bolt and the like in the proper orientation. A roller 130 is secured to the pin 125.

A longitudinal cam bar 135 (see also FIG. 3) is pivotally connected by a link 136 to the beam 25 at one end of the bar and is secured at its other end 137 to a link 138. The link 138 is connected to an operating level 139 at the front end of the cart, the operating lever being pivoted at 140 to the U-shaped frame member 12 of the bed 9. The link 138 has a pivot pin 141 connection to the bar 135, the axis of the pivot pin 141 being substantially the same as the axis of the hinges 13 for the U-shaped member 12 so as to permit the U-shaped member 12 to be pivoted downwardly without interference from the connection between the operating lever 139 and the bar 135. The bar 135 has an angulated cam slot 145 which receives a pin 146 fixed to the transverse rod 19.

When the operating lever 139 is pulled toward the front of the cart, the cam bar 135 will be caused by the link 136 and the pin and slot 146, 145 to cam laterally away from the beam 25. As shown in FIG. 5, lateral movement of the cam bar 135 away from the beam 25 will force the bolt 122 away from the lock member 105, thereby freeing the slide 80 for longitudinal movement in either direction with respect to the bed of the cart.

An elongated tension spring 142 is fixed at one end 143 to the beam 25 and at the other end 144 to the slide 80, the spring passing around a post 147 at the front end of the slide, thereby normally urging the slide toward the front of the cart. Thus, when the slide 80 is unlocked and the front of the cart lifted, the spring will urge the slide to its frontmost position with the bolt sliding into hole 112 to lock the slide there. In this attitude, the front end of the cart is elevated (FIG. 2) to permit it to be thrust onto the high deck of an ambulance.

As indicated above, the slide 50 is similarly constructed with a spring-loaded bolt 122 operated by a cam bar 150. The cam bar 150 is connected at one end 151 by a link 152 to the beam 25. At the other end 153, the cam bar has a slot 154 through which a pin 155 passes, the pin being fixed to the transverse rod 16. A rear operating lever 158 is pivoted intermediate its ends to a bracket 159 and has a free end 160 engageable with the cam bar 150. When the operating lever 158 is pulled toward the rear, the cam bar 150 is forced in a forward direction and the link 152 and slot and pin 154, 155 cause the cam bar 150 to swing laterally away from the beam 25 to force the bolt away from the beam 25, thereby freeing the slide for longitudinal movement in either direction with respect to the bed. Cam bar 135 has a spring 165 connected to the transverse rod 16 urging the cam bar toward the rear, and cam bar 150 has a spring 166 connected to the transverse rod 16 urging cam bar 150 toward the rear.

The bed 9 has auxiliary wheels 170 secured by brackets 171 to the front end of the bed, the brackets being mounted on the U-shaped tubular member 12. The auxiliary wheels 170 are adapted to support the front end of the cart on the deck of the ambulance as the cart is thrust into the ambulance and removed from the ambulance, thereby providing a major support for the weight of the cart and patient which in turn greatly eases the strain of the patient transfer when he is being introduced or removed from an ambulance cart.

The front legs 70 and the connection of the brace 85 to them are specially mounted and oriented to facilitate the operation of the invention. By comparing FIGS. 1 and 2, it can be seen that from upper pivot axis to lower pivot axis the front legs are substantially longer than the rear legs 40. Therefore, in the normal horizontal position of the cart the front legs are generally inclined, that is, the upper pivot connection of the legs to the slide 80 is substantially rearward of the lower connection of the legs to the frame. When the slide 80 is moved to its frontmost position, as shown in FIG. 2, the respective pivot axes are above one another and the front end of the cart is elevated to a position for introduction into the ambulance. In that position the bolt 122 on the slide 80 is introduced into the hole 112 of the lock member 105 is hold the legs 70 in that attitude.

The brace 85 is connected to the legs 70 by the clevis link 90 to permit the legs to have a triangular bracing configuration, as shown in FIG. 1, with the clevis link substantially aligned with the brace 85 while also permitting that traingle to collapse when the legs are moved to the vertical position of FIG. 2. The clevis link connection also permits the brace and legs to move with respect to one another when the legs are swung rearwardly and upwardly as the cart is thrust into the ambulance.

The S configuration of the legs creates a recess as at 172 so as to avoid interference with the crossbar 64 on the lower frame 55 when the cart is in fully collapsed condition.

OPERATION

There are two types of operations permitted by the cart of the present invention. One operation involves the thrusting of the cart into the ambulance with the legs swinging together in a rearward and upward direction as depicted in FIGS. 7A-7D. The other sequence of operations involves the lowering of the cart with the bed in a horizontal attitude to one of several selectable positions in order to facilitate the transfer of a patient between the cart and beds of varying heights. In that sequence of operations, the legs generally move apart from one another in spread-eagle fashion as depicted in FIGS. 8A-8D.

In introducing the cart into an ambulance whose deck may be as high as approximately 32 inches, an operator standing at the front of the cart pulls operating lever 139 toward him and, while grasping the front of the cart, raises it slightly. The manipulation of the operating lever 139 draws the cam bar 135 in a forward direction, causing it to move laterally away from the beam 25, thereby withdrawing the bolt 122. The spring 142 draws the slide to the front of the cart. At its forwardmost position, the slide stops and the bolt is released to drop into the hole 112, thereby fixing the slide 80 in the forwardmost position. The cart is thus brought to the attitude depicted in FIG. 7A and can be moved forwardly toward the ambulance with the auxiliary wheels 170 rolling onto a deck 175 of the ambulance. The operator, standing at the rear of the cart, operates lever 158 to cause the cam bar 150 to move in a forward and laterally outward direction, disengaging the bolt 122 from the hole 113. As the operator continues to thrust the cart forward, the engagement of the front of the legs 70 with the ambulance causes the legs 70 and 40 to swing rearwardly and upwardly, as shown in FIGS. 7B and 7C. Continued thrust of the cart in a forward direction causes a complete collapse of the legs, with the front legs resting on the nylon pad covering the front surface. That fully collapsed condition within the ambulance is depicted in FIG. 7D. In removing the patient from the ambulance, the reverse sequence of steps is followed, the cart is first pulled from the ambulance and the legs drop down as indicated in FIGS. 7C and 7B until they snap into position, as shown in FIG. 7A. Thereafter, the cart is continued in a rearward direction to complete the removal from the ambulance. After removal from the ambulance, an operator standing at the front of the cart operates lever 139 while holding the bed frame and lowers the front end of the cart. Releasing lever 139 permits the spring-urged bolt to drop into the hole 111, thereby positioning the bed in a horizontal attitude.

When the level of the cart is to be changed in order to accommodate it to a lower bed height, the sequence of operations illustrated in FIGS. 8A-8D is followed. The operator grasping the front end of the cart and lever 139 disengages the bolt 122 from the slide 80, permitting the slide to move in a rearward direction. When the desired level is reached, the lever 139 is released, thereby permitting the bolt to seek the proper hole 106-110. Similarly, at the other end of the cart, an operator grasping lever 158 removes the bolt 122 on the slide 50 from its hole 113 and the weight of the cart causes the slide to move in a rearward direction until the proper level is reached. Thereafter, the lever is released in order to permit the bolt to seek the proper hole 114-118. During this sequence of operations, the rectangular frame 55 extends while lying parallel to the ground and maintains the casters' swivel axes in a vertical orientation in the manner described in application Ser. No. 545,969.

It can be seen from FIG. 8D that the cart can be lowered quite close to the ground as well as to any one of a number of higher levels to facilitate the transfer of a patient from the ground onto the cart and from the cart onto beds of differing heights.

We claim:
1. A cart comprising,
a normally horizontal bed having front and rear ends,
auxiliary wheels on the front end of said bed,
rear legs pivotally mounted on rear portion of said bed and extending downwardly from said bed,
front legs pivotally mounted on the front portion of said bed and extending downwardly from said bed, means connecting said legs to ground engaging casters, releasable means normally bracing said legs with respect to said bed and being releasable to permit said legs to swing rearwardly and upwardly while said front end of said bed is in a raised attitude, the upper ends of said front legs being pivotally and slidably connected to said bed at a location which is normally rearward of the lower ends of said front legs, the upper ends of said front legs being slidable forwardly on said bed to raise the front end of said bed, a front brace pivoted at its upper end to said bed forward of the upper ends of said front legs and extending downwardly to said front legs, and links pivoted at one end to said front legs intermediate upper and lower ends of said front legs and pivoted at the other end to the lower end of said brace, whereby when the upper ends of front legs are slid forwardly to raise the front end of said bed and said front legs are swung rearwardly in thrusting the cart into a vehicle, the upper ends of said brace and front legs, respectively, remain in a longitudinally fixed position with respect to said bed, said link permitting said legs and brace to swing rearwardly without binding.

2. A cart as in claim 1 in which said brace is U-shaped and extends across and under said front legs, said links being connected to said legs and extending downwardly to said brace when said cart is in upright position.

* * * * *